Jan. 4, 1944.  H. M. KIECKHEFER  2,338,338
STIFFNESS TESTING DEVICE
Filed Dec. 5, 1942
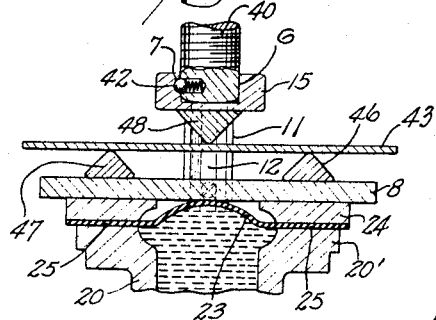
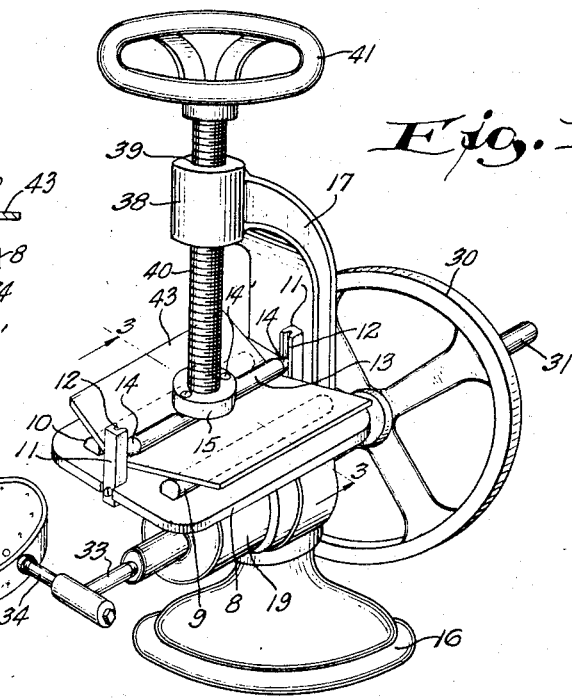
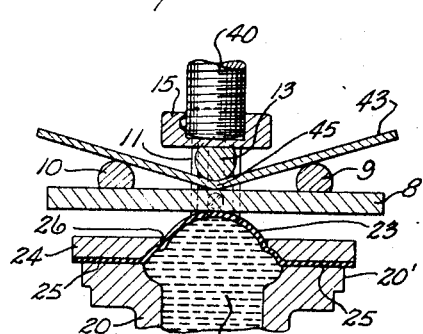
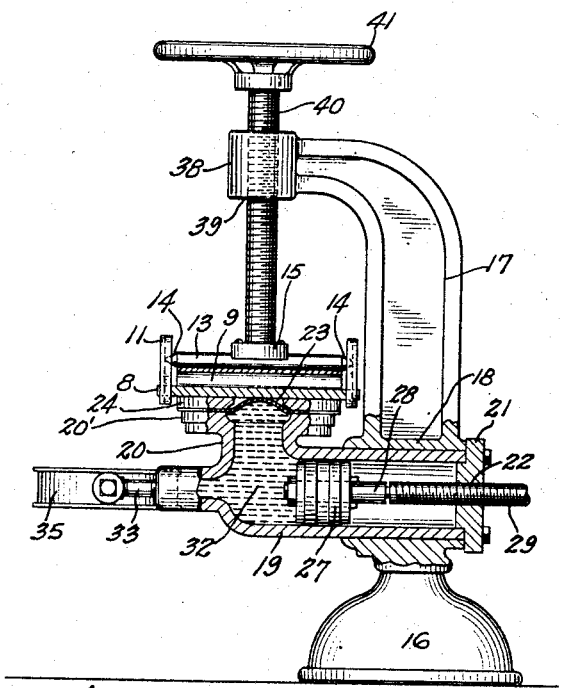
INVENTOR.
Herbert M. Kieckhefer
BY Morsell & Morsell
ATTORNEYS.

Patented Jan. 4, 1944

2,338,338

UNITED STATES PATENT OFFICE 2,338,338

STIFFNESS TESTING DEVICE

Herbert M. Kieckhefer, Riverton, N. J., assignor to Kieckhefer Container Company, Delair, N. J., a corporation of Delaware Application December 5, 1942, Serial No. 467,996

2 Claims. (Cl. 265—14)

This invention relates to improvements in stiffness testing devices, and is more particularly adapted for use in determining and recording the stiffness of various types of container board.

Heretofore various devices have been employed for determining the resistance of container board to a puncturing operation. In these devices an increasing pressure is applied at a particular spot on the surface of the sheet. Other devices have been designed to record the resistance of an assembled container to compression. A stiffness test, however, is particularly important where the container board is to be used in boxes which are likely to be subjected to the action of water during transportation. Where such conditions of use are anticipated it is desirable to immerse samples of the board in water for a predetermined period and then to have an accurate method of determining whether the material maintains sufficient strength and carrying ability after such immersion.

It is therefore an object of the present invention to provide a simple and inexpensive device which is capable of accurately determining and recording the stiffness of various types of container board.

A further object of the invention is to provide a device which may be furnished in the form of an attachment suitable for use in quickly adapting standard testing devices to the testing of stiffness.

A more specific object of the invention is to provide an improved device of the class described including spaced elongated supports mounted on a common base, and positionable on the supporting table of a standard tester such as the "Mullen" tester, said supports being engageable beneath one surface of the sample to be tested, and a single relatively movable elongated member positionable on the other surface of the sample between said elongated supports and engaged by the top adjusting screw of a tester such as the "Mullen" tester. With this arrangement relative movement of said members, caused by operation of the tester, is adapted to cause bending of the sample on a line intermediate the spaced elongated supports and directly below the single elongated member.

With the above and other objects in view, the invention consists of the improved stiffness testing device and all its parts and combinations as set forth in the claims and all equivalents thereof. In the accompanying drawing illustrating preferred embodiments of the invention, in which the same reference numerals designate the same parts in all of the views, Fig. 1 is a perspective view showing the stiffness testing device as used in conjunction with one form of standard testing machine;

Fig. 2 is a side elevational view of the complete apparatus, parts being broken away and shown in section;

Fig. 3 is a fragmentary sectional view taken approximately on the line 3—3 of Fig. 1 showing the position of the parts before pressure is applied;

Fig. 4 is a similar view showing the positions of the parts after maximum bending has been accomplished; and Fig. 5 is a view similar to Fig. 3 showing a slight modification.

Referring more particularly to the drawing, the improved device includes a base plate 8 of metal or other suitable material having rigidly mounted thereon spaced elongated supporting members 9 and 10. These members are also preferably formed of metal and are rigidly connected to the base plate 8 in any desired manner. At each end of the base plate is an upstanding guide member 11 formed with an inwardly directed vertical groove 12. An elongated sheet contacting member 13 is preferably formed with its ends pointed as at 14 to slidably cooperate with the vertical grooves 12 of the guides 11. Suitably connected to the top of the elongated contact member 13 by screws or the like 14' is an attaching collar 15. The collar has its top surface recessed as at 6 and within the recess there may be an annular groove 7.

The device may be adapted for use in connection with any one of a number of standard testing devices now on the market. In the drawing a "Mullen" type of tester is shown. This tester comprises a suitable supporting base 16 having an upstanding inverted L-shaped arm 17. Near the lower end of the arm is a bearing 18 for supporting a horizontally disposed cylinder 19. The cylinder has one end projecting upwardly as at 20 and has its other end closed by a head 21 formed with a threaded opening 22.

The upper end of the cylinder 20 has a projecting flanged portion 20' which supports a flexible diaphragm 23 of rubber or other suitable material. A top plate 24 is secured over the edges 25 of the diaphragm to hold the latter in sealed position. The top plate 24 is formed with a center opening 26 through which the diaphragm may project during use.

Within the horizontal portion of the cylinder is a piston 27, and projecting outwardly from the piston is a piston rod 28. The piston rod may be threaded as at 29 for cooperation with the threaded opening 22 of the head 21. On the end of the projecting portion of the piston is a wheel 30 having a hand crank 31 thereon.

Between the diaphragm 23 and the piston the cylinder is filled with a hydraulic medium, such as glycerin 32, and the glycerine-filled chamber is connected by ducts 33 and 34 with a suitable pressure gauge 35 having an indicating hand 36 cooperable with designations on a dial 37. The upper and laterally extending end of the arm 17 is formed with a vertically disposed bearing 38 having a threaded bore 39 therein. Threaded in said bore is a screw 40 having a manual wheel 41 rigidly connected to its upper end.

The lower end of the screw may be equipped with a yielding ball 42, and for this reason the collar 15 has its recess formed with the annular groove 7 so that the collar may be pushed into engagement with the lower end of the screw, with the ball 42 snapping into the groove 17. Thus the collar may be quickly connected to the lower end of the screw in such a manner that the lower end of the screw will support the collar and elongated contact member 13. Any other method of detachably connecting the lower end of the screw to the collar may be employed, depending upon the nature of the screw in the particular machine being used.

In use of the device, the collar is connected to the lower end of the screw 40 as indicated in the drawing, and the hand wheel 41 is rotated to lower the collar and suspended contact member 13. The base 8 of the stiffness tester is placed on the top plate 24, as shown in Figs. 1 and 3, and a sample of container board 43 is placed on top of the elongated members 9 and 10 as shown in Fig. 3. With the pointed ends of the contact member 13 engaging the slots or grooves 12 of the guiding members 11, the hand wheel 41 is then rotated further until the lowermost portion 44 of the elongated contact member 13 just touches the upper surface of the container board sample 43. In this position the sample 43 should be capable of being withdrawn by a slight pull. The screw 40 is then left in this position for all tests on board of the same thickness.

Next the crank 31 is turned at a normal rate, such as forty or fifty turns a minute. This causes inward movement of the piston 21 and the exertion of pressure upon the hydraulic fluid 32. This pressure causes movement of the diaphragm from the position of Fig. 3 to a position approximating that shown in Fig. 4. During this movement of the diaphragm the base plate 8 of the stiffness tester is elevated as shown in Fig. 4 so that there is a relative movement which takes place between the elongated members 9—10 and the elongated contact member 13. This relative movement is permitted because of the sliding contact between the guides 11 and the ends of the contact member 13. During such relative movement a bending pressure is applied to the sample 43 along the line 45 (Fig. 4), and this line is parallel to and intermediate the spaced elongated members 9 and 10. The bending line is also directly below the bottom of the elongated contact member 13. As the crank handle 31 is rotated, and as the base plate 8 is gradually elevated from the position of Fig. 3 toward the position of Fig. 4, the operator watches the pressure gauge 35. The needle on the gauge will record the fluid pressure within the hydraulic chamber. When the first break or surface rupture in the sample occurs, the gauge hand 36 tends to stop its progressive movement and to remain stationary. The cranking may then be stopped and the reading taken.

By then cranking in a reverse direction the pressure on the diaphragm may be relieved and the base plate 8 of the stiffness tester brought back to the position of Fig. 3. Then without changing the position of the screw 40 the sample 43 may be removed and another sample of the same thickness inserted for the purpose of making a comparative test. If a sample of different thickness container board is to be tested, then a corresponding adjustment of the screw 40 must be made.

In the use of a device of this type to test container board which may be subjected to water, the board may be first immersed in water for a desired period of time and then tested to record its stiffness after immersion. It is also useful to first test the material before immersion and then after immersion and compare the two results.

In the principal form of the invention just described, the elongated supporting members 9 and 10, and the elongated member 13, are circular in cross-section. For testing certain types of board it may be desirable to vary this cross-sectional shape, and Fig. 5 illustrates a modification wherein the elongated supporting members 46 and 47, as well as the elongated contact member 48, are triangular in cross-section. It may in certain uses be preferable to have the top contact member 48 only of triangular cross-section and to have the lower elongated supporting members circular in cross-section.

Various other changes and modifications may be made without departing from the spirit of the invention, and all of such changes are contemplated as may come within the scope of the claims.

What I claim is:

1. A stiffness testing attachment for use with a testing machine, said testing machine having a work supporting plate, having an adjustment screw, having a movable force applying member, and having a force indicator comprising a base positionable on the work supporting plate of said testing machine to be elevated by movement of the force applying member of said machine, guides secured to opposite edges of said base and projecting upwardly therefrom and movable therewith, spaced elongated supporting members mounted on said base for engagement with the lower surface of a sample of material to be tested to support said sample, an elongated contact member engageable with the opposite surface of said sample on a line extending between and in the same general direction as said spaced supporting members, the ends of said contact member being movably engaged with said guides, and means on said contact member for removable connection with the adjustment screw of said testing machine, whereby upward movement of said base will cause bending of the sample.

2. A testing device comprising a supporting plate having an opening, a force applying member movable upwardly through said opening, means for exerting pressure on said force applying member, a rigid base positionable on said supporting plate and adapted to be moved upwardly by said force applying member, guides secured to opposite edges of said base and projecting upwardly therefrom and movable therewith, spaced elongated supporting members mounted on said base for engagement with the lower surface of a sample of material to be tested to support said sample thereon, an elongated contact member engageable with the opposite surface of said sample on a line extending between and in the same general direction as said spaced supporting members, the ends of said contact member being movably engaged with said guides, means for adjustably sustaining said contact member in a desired position whereby upward movement of said base will cause bending of the sample, and means for recording the amount of pressure exerted on said force applying member.

HERBERT M. KIECKHEFER.